United States Patent [19]

Achar et al.

[11] Patent Number: 4,649,189

[45] Date of Patent: Mar. 10, 1987

[54] PROCESS FOR PREPARING PHTHALOCYANINE POLYMER FROM IMIDE CONTAINING BISPHTHALONITRILE

[75] Inventors: Bappalige N. Achar, Mysore, India; George M. Fohlen, Millbrae; John A. Parker, Los Altos, both of Calif.

[73] Assignee: The United States of America as represented by the Administrator of the National Aeronautics and Space Administration, Washington, D.C.

[21] Appl. No.: 754,362

[22] Filed: Jul. 12, 1985

Related U.S. Application Data

[63] Continuation-in-part of Ser. No. 565,482, Dec. 22, 1983, abandoned.

[51] Int. Cl.[4] ............................................. C08G 73/10
[52] U.S. Cl. ..................... 528/220; 528/229; 528/322; 528/327; 528/331; 528/362
[58] Field of Search ............... 528/322, 327, 331, 220, 528/229, 362

[56] References Cited

U.S. PATENT DOCUMENTS 3,954,710  5/1976  Bower et al. .................. 260/47 CP
3,996,196  12/1976  D'Alelio ....................... 260/47 CP

*Primary Examiner*—Harold D. Anderson
*Attorney, Agent, or Firm*—Darrell G. Brekke; John R. Manning; Robert D. Marchant

[57] ABSTRACT

Imide-linked bisphthalonitrile compounds are prepared by combining a dicyano aromatic diamine and an organic dianhydride to produce an amic acid linked bisphthalonitrile copound. The amic acid linked bisphthalonitrile compound is dehydrocyclized to produce the imide-linked bisphthalonitrile compounds. The imide-linked bisphthalonitrile compounds may be polymerized to produce a phthalocyanine polymer by heating the imide-linked bisphthalonitrile compound, either alone or in the presence of a metal powder or a metal salt. These compounds are useful in the coating, laminating and molding arts. The polymers are useful in composite matrix resins where increased fire resistance, toughness and resistance to moisture are required, particularly as secondary structures in aircraft and spacecraft.

15 Claims, No Drawings

PROCESS FOR PREPARING PHTHALOCYANINE POLYMER FROM IMIDE CONTAINING BISPHTHALONITRILE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This application is a continuation-in-part of application Ser. No. 565,482 filed Dec. 22, 1983, now abandoned.

BACKGROUND OF THE INVENTION

1. Field of the Invention

This invention relates to an improved process for synthesizing bisphthalonitrile derivatives having imide and ester-imide linkages, and to a process for preparing phthalocyanine polymers from those derivatives. More particularly, it relates to such processes which result in phthalocyanine polymers having increased thermal and thermo-oxidative stability and toughness over prior art phthalocyanine polymers.

2. Description of the Prior Art

Polymers incorporating a phthalocyanine structure in the polymeric backbone have been of considerable interest in the prior art, due to hoped for properties to be obtained with such polymers, such as thermal stability, chemical inertness, pleasing color, semiconductivity, catalytic activity and photoconductivity. In particular, it is felt that the incorporation of the phthalocyanine structure should increase the heat resistance property of polymers, as well as giving increased fire resistance and resistance to moisture absorption. However, many attempts in the prior art to prepare such phthalocyanine polymers fail to give phthalocyanine polymers with high molecular weight. More recently, the successful synthesis of many ether- and amide-linked bisphthalonitrile derivatives and their polymerization has resulted in phthalocyanine polymers having high degrees of polymerization. Such derivatives and their polymers are described in, for example, U.S. Pat. No. 4,234,712, issued 1980 to Keller et al.; U.S. Pat. No. 4,067,860, issued Jan. 10, 1978 to Griffith et al.; U.S. Pat. No. 3,993,631, issued Nov. 23, 1976 to Griffith et al.; and by Walton et al., Polym. Sci. Technol. Adhes. Sci. Technol., 9B, 665 (1975). These polymers can be heat cured alone or in the presence of a metallic salt or powder.

The polymerization of ether-linked bisphthalonitrile derivatives has also been studied in the presence of hydrogen donating curing agents such as benzyl trimethyl ammonium hydroxide, hydroquinone, catechol, resorcinol, benzoin, bisphenol A, and the like, in order to decrease polymerization time, as reported by Marullo et al., Polym. Prepr., Am. Chem. Soc. Div. Polym. Chem., 22, 48 (1981).

Although the polymers resulting from such work had some increased thermal stability, they appear to be somewhat less stable than hoped for in a polymer having a phthalocyanine structure.

Polyimide-metallophthalocyanines are also known, as described in, for example, U.S. Pat. No. 3,890,274, issued June 17, 1975 and U.S. Pat. No. 3,996,196, issued Dec. 7, 1976 to D'Alelio. These polymers are made by synthesizing a bisphthalonitrile using a bisphthalic anhydride derivative, an aromatic diamine and an aromatic compound containing two orthocyano groups and one amino group. Polymerization is then effected by heat alone, or in the present of metal salts or powders. However, this method of preparing the bisphthalonitrile compounds appears to involve side reactions, in addition to producing non-uniform bisphthalonitrile derivatives, therefore apparently adversely affecting the properties of the polymers produced. Further, D'Alelio describes a phthalocyanine structure wherein the "n" is a positive integer of at least one. There is no method described such that "n" is always zero for the four "G" groups attached to the pthalocyanine structure. Therefore, regular uniform sheet-type or ladder-type phthalocyanine polymers are not possible to be formed from these monomers and this approach.

A wide variety of polyimides are also known in the prior art. U.S. Pat. No. 3,897,395, issued July 29, 1975, and U.S. Pat. No. 4,060,515, issued Nov. 29, 1977, both to D'Alelio, disclose nitrile terminated polyimides prepared by reacting an aromatic dianhydride with an aromatic diamine and, optionally, an organic monoamine. U.S. Pat. No. 3,948,941, issued Apr. 6, 1976, to Patton, discloses a process for the preparation of polyimides using isocyanates and a catalytic quantity of a cyanide ion. U.S. Pat. No. 4,021,415, issued May 3, 1977, to Chang teaches nitrile containing polyamides. U.S. Pat. No. 4,069,209, issued Jan. 17, 1978 to Lange discloses imino acid resins and poly(ester-imides) prepared from such resins. U.S. Pat. No. 4,368,319, issued Jan. 11, 1983 to Hocker et al., discloses film forming electrically conductive cyclic polyimides, prepared from reacting a dianhydride with various alkylene amines.

U.S. Pat. No. 4,238,601, issued Dec. 9, 1980 to Keller et al. also discloses the preparation of phthalocyanine polymers from bisorthonitrile monomers.

Thus, while the art pertaining to polyimides, polyester-imides and various phthalocyanine polymers is a well developed one, a need remains for the preparation of phthalocyanine polymers which achieve more of the potential value of incorporating phthalocyanine moieties in a polymeric backbone.

SUMMARY OF THE INVENTION

Accordingly, it is an object of this invention to prepare phthalocyanine polymers having increased thermal stability over phthalocyanine polymers prepared by prior art processes.

It is a further object of the invention to provide a process for making precursors of phthalocyanine polymers which can be polymerized to give such polymers with improved properties.

It is another object of the invention to provide a process for preparing phthalocyanine polymers in which side reactions are reduced.

It is still another object of the invention to provide a process in which phthalocyanine polymers are prepared from bisphthalonitrile intermediates, in which more uniform bisphthalonitrile intermediates are provided in the process.

The attainment of these and related objects may be achieved through the novel process for preparing imide liked bisphthalonitrile compounds and phthalocyanine polymers herein disclosed. As used herein, the term "imide linked" is intended to embrace both imide linkages and imide-ester linkages. In accordance with this invention, imide-linked bisphthalonitrile compounds are prepared by combining a dicyano aromatic monoamine and an organic dianhydride to produce and amic acid linked bisphthalonitrile compound. The amic acid linked bisphthalonitrile compound is dehydrocyclized to produce the imide-linked bisphthalonitrile compounds. The process of this invention may be continued to produce phthalocyanine polymers by heating the imide-linked bisphthalonitrile compound, either alone or in the presence of a metal powder or a metal salt. The resulting polymers so produced have superior thermal stability, with polymer decomposition temperatures ranging from about 350° C. to 500° C.

The attainment of the foregoing and related objects, advantages and features of the invention should be more readily apparent to those skilled in the art, after review of the following detailed description of the invention, including the examples.

DETAILED DESCRIPTION OF THE INVENTION

Suitable dianhydrides for reaction with the dicyano aromatic monoamine have the formula:

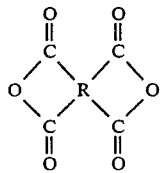

The dicyano aromatic monoamines have the formula:

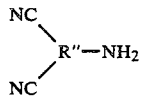

The resulting amic acid linked bisphthalonitrile compounds have the formula:

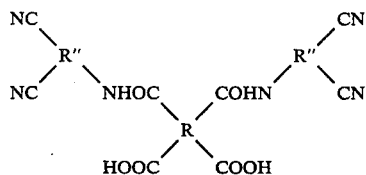

After dehydrocyclizing, the resulting imide-linked bisphthalonitrile compound has the formula:

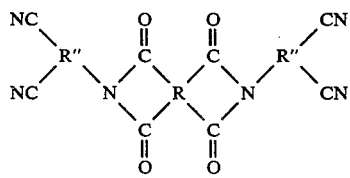

In each of the above formulas, R is a tetravalent (tetrasubstituted) organic group, preferably an aromatic group, and R″ is a trivalent (trisubstituted) aromatic hydrocarbon group. Preferably, R as a tetravalent organic group does not include any additional imide or aromatic imide-type structures or units. Preferably, R″ as a trivalent aromatic group does not include additional imide or aromatic imide-type structures or groups.

In the special case of the above formulas in which the R group contains ester linkages, so that the bisphthalonitriles have an ester-imide linkage, precursor bisphthalic anhydrides with ester linkages are prepared by reacting a monoacid chloride with an aliphatic or aromatic dihydroxy compound in the presence of a hydrogen chloride acceptor, such a pyridine, as follows:

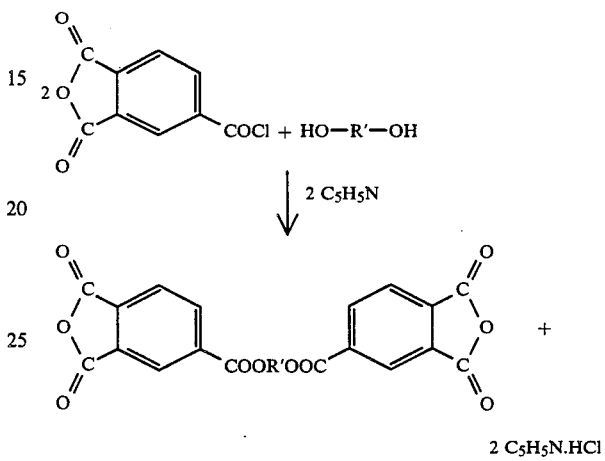

In these formulas, R' is an aliphatic or aromatic group. Depending upon the final physical and chemical properties desired, R' is preferably an aromatic group. If increased toughness of the polymer at intermediate temperatures is desired, R' is preferably an aliphatic group. Examples of suitable dianhydrides for the synthesis of bisphthalonitriles with imide linkages are: 3,3',4,4'-benzophenone tetracarboxylic dianhydride; 1,2,4,5-benzene tetracarboxylic dianhydride; bis(3,4-dicarboxyphenyl) ether dianhydride; 2,3,5,6-pyrazine tetracarboxylic dianhydride 2,3,4,5-thiophene tetracarboxylic dianhydride; 3,3',4,4'-diphenyl tetracarboxylic dianhydride; 2,3,6,7-naphthalene tetracarboxylic dianhydride; 1,4,5,8-naphthalene tetracarboxylic dianhydride; 2,6- and 2,7- dichloronaphthalene-1,4,5,8-tetracarboxylic dianhydride; 2,3,6,7-tetrachloronaphthalene-1,4,5,8-tetracarboxylic dianhydride; 1,8,9,10-phenanthrene tetracarboxylic dianhydride; 3,4,9,10-perylene tetracarboxylic dianhydride and the like. The preferred dianhydride is 3,3',4,4'-benzophenone tetracarboxylic dianhydride having the following structure:

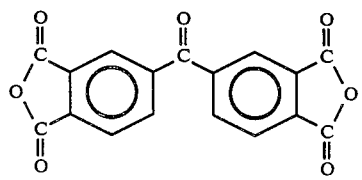

The dicyano aromatic monoamine is most preferably the simplest known for this class of compounds, namely 4-aminophthalonitrile. R″ is preferably a trivalent aromatic hydrocarbon containing 6 to 14 carbon atoms. Examples of such preferred monoamines are $NH_2C_6H_3(CN)_2$, $NH_2CH_2C_6H_3(CN)_2$, NH$_2$C$_{10}$H$_5$(CN)$_2$ and NH$_2$C$_{14}$H$_7$(CN)$_2$. A more preferred amine is NH$_2$—C$_6$H$_3$(CN)$_2$.

Various types of bisphthalic anhydrides with ester linkages may be prepared by the reaction of trimellitic anhydride acid chloride and aromatic or aliphatic compounds containing two hydroxyl groups in the presence of a hydrogen chloride acceptor. Pyridine or triethylamine can be used for the hydrogen chloride acceptor. Pyridine is the preferred hydrogen chloride acceptor. The synthesis may be carried out either cold or at ambient temperature. Suitable solvents for the synthesis include ether, 1,2-dichloroethane, benzene, chlorobenzene, dichloromethane and the like. The preferred solvents are ether and 1,2-dichloroethane.

Suitable aliphatic diols for synthesis of the bisphthalic anhydrides with ester likages contain from 2 to 12 carbon atoms, preferably from 2 to 6 carbon atoms. Aromatic diols give more stable bisphthalic anhydrides with ester linkages and the polymers obtained from the bisphthalonitrile derivatives with ester-imide linkages obtained from them are also more stable. Suitable specific examples of the aromatic diols include: bis(4-hydroxyphenyl)methane; 4,4'-thiodiphenol; bis(4-hydroxyphenyl)-sulfone; bis(4-hydroxyphenyl)ether; bisphenol A; 4,4'-dihydroxy benzophenone; resorcinol; 1,3-dihydroxy naphthalene; 1,5-dihydroxy naphthalene; 9,9-bis(4'-hydroxyphenyl)-fluorene; 9,9-bis(3',5'-dimethyl-4'-hydroxyphenyl)-fluorene and the like.

The first step in the formation of the bisphthalonitrile derivatives with imide and ester imide linkages reacts dicarboxylic anhydride groups with the amine group of the dicyano aromatic monoamine to give amic acid linkages. This step is desirably carried out in a solvent, such as dimethylsulfoxide; N,N-dimethyl acetamide; N,N-dimethyl formamide or N-methyl pyrolidinone. The preferred solvents are dimethyl sulfoxide and N,N-dimethyl acetamide. The reaction is carried out at temperatures between about 20 and about 100 C. The second step of the reaction can be carried out either by thermal cyclization, azeotroping the water of cyclization, or by boiling in glacial acetic acid and refluxing in the present of fused sodium acetate. The most efficient and preferred route for this purpose is the thermal cyclization method.

The bisphthalonitrile derivatives with imide and ester-imide linkages can be polymerized by heating the materials in the presence of metallic powders (M) or metal salts (MY). Metallic powders (M) of copper, cobalt, nickel, manganese, zinc, lead, tin, aluminum, iron, silver, molybdenum, vanadium, beryllium, palladium, platinum and the like can be used. The preferred metallic powders are copper, cobalt and nickel. Metal salts (MY) are especially preferred, because the polymerization reaction is faster. Halides, sulfates, formates, acetates, carbonates, cyanides, sulfides, and tartrates of the above-mentioned metals can be used. The preferred metal salts are cuprous chloride, cupric chloride, cobalt chloride and nickel chloride, with cuprous chloride being especially preferred.

In the present invention the polymers belong to a thermosetting class of polymers where the polymers are sheet-like or ladder type. Related phthalocyanine sheet-like polymers are described by Achar, et al., *J. of Polymer Sci. Polymer Chem. Ed.*, Vol. 20, 1785–1790 (1982), which is incorporated herein by reference. The polymerization occurs in one step with the formation of the phthalocyanine molecule, preferably in the absence of solvent (i.e. neat), or in the presence of a metallic powder or metallic salt.

Ladder and sheet polymers are also generally discussed in "Heat Resistance Polymers" by J. Preston in the Kirk-Othmer: Encyclopedia of Chemical Technology, 3rd Ed., Vol. 12, pp. 220–225, published in 1980, and references cited therein, which is incorporated herein by reference.

The bisphthalonitriles of the present invention are essentially pure monomers which produce more uniform polymers having ester-imide and imide linkages having a uniform length in the polymers. Those polymers of the present invention having an aliphatic ester linkage will exhibit more flexibility and toughness. The flexibility of the polymers having the aliphatic ester linkage (as part of the R group) will also contribute to a more complete reaction of the —C N groups to produce the phthalocyanine structure.

The polymerization occurs by heating the bisphthalonitrile monomers to produce polymer having a uniform structure, either ladder type or sheet-like structures.

Structure A as shown below indicates how the phthalocyanine polymers of the present invention:

Structure A

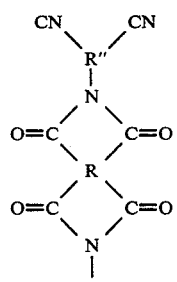

Structure A

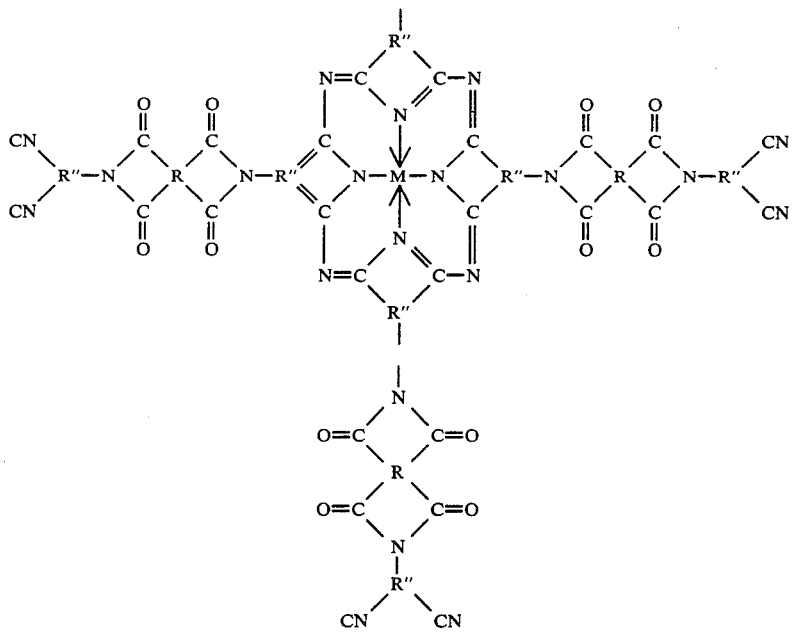

As can be seen from Structure A the four groups about the central M—(where M is the metal atom as is described herein) are essentially identical. Each branch in the north, south, east and west directions terminate in a dicyano grouping which is capable of bonding with another "M" to create the regular ladder-type or sheet-type polymers of the present invention.

The imide-linked bisphthalonitriles of the invention as well as their derived phthalocyanine polymers have utility in the coating, laminating and molding arts. The monomers and polymers are useful in composite matrix resins where increased fire resistance and resistance to moisture absorption are desired. They can be used as wire insulation, adhesives, coatings on all types of substrates, including refractory materials such as asbestos board, ceramics, circuit boards for semiconductor having elevated temperature applications and the like. The composite materials can be fabricated in the usual manner into reinforced laminated structures with with fiberglass, carbon or boron fibers in the form of filaments, mat or cloth. They can be mixed with fillers such as absestos particles, or glass fiber particles and molded into heat resistant shaped structures using conventional molding processes. The polymers and composite materials are useful in interior flame-resistant panels in, for example, aircraft and space craft structures. These polymers and composites are also useful in temperature limits beyond those of conventional epoxy based resins.

The following non-limiting examples explain the invention further and represent best modes contemplated by the inventors for practice of the invention.

EXAMPLE 1

(APN-BPTDA)

4.0 Grams of 4-aminophthalonitrile is dissolved is 35 ml of dry dimethyl sulfoxide contained in a three-necked flask provided with a nitrogen inlet, calcium chloride drying tube and a glass stopper. The solution is stirred using a magnetic bar. Dry nitrogen gas is bubbled through the solution and 4.502 g of benzophenone tetracarboxylic dianhydride solid is added to the vigorously stirring solution. After stirring for half an hour, the solvent is removed in an air-draft oven at 75 C. followed by heating the solid in vacuum at 165 C. for one hr.

Analysis: Calculated for $C_{33}H_{12}N_6O_5$; C, 69.23%; H, 2.11%; N, 14.68%. Found: C, 68.34%; H, 2.4%; N, 14.63%; m.p. 272 C.

EXAMPLE 2

(APN-PMDA)

4.0 Grams of 4-aminophthalonitrile and 3.048 grams pyromellitic dianhydride are reacted as described in Example 1. After removing the solvent, the solid is heated in vacuum at 180 C. for 45 minutes.

Analysis: Calculated for $C_{26}H_8N_6O_4$; C, 66.67%; H, 1.72%; N, 17.94%. Found: C, 65.87%; H, 1.74%; N, 17.34%; m.p.=410 C.

EXAMPLE 3

(BPA-C2)

10 Grams of trimellitic anhydride acid chloride is placed in a three-necked flask containing 100 ml of anhydrous ethyl ether. The flask is provided with a nitrogen inlet, an outlet with a calcium chloride drying tube and a mechanical stirrer. Dry nitrogen gas is bubbled through the solution. To the vigorously stirring solution, a solution of 3.8 grams of pyridine containing 1.47 grams of ethylene glycol is added. Temperature of the solution rises to 28–30 C. Stirring is continued for 45 min. Then methanol is added, stirred well, filtered and the precipitate is washed with methanol and ether. The dried bisphthalic anhydride derivative is recrystallized with dry acetic anhydride. Yield 40%

Analysis: Calculated for $C_{20}H_{10}O_{10}$: C, 58.55%; H, 2.46%. Found: C, 58.26%; H, 2.66%; m.p. 171 C.

EXAMPLE 4

((BPA-C3))

10 Grams of trimellitic anhydride acid chloride and 3.8 grams pyridine containing 1.84 grams of 1,3-propanediol is reacted as described in Example 3. Yield 56%.

Analysis: Calculated for $C_{21}H_{12}O_{10}$: C, 59.44%; H, 2.86%. Found: C, 58.17%; H, 2.76%; m.p. 202 C.

EXAMPLE 5

(BPA-C4)

2.14 Grams of 1,4-butanediol, 3.8 grams of pyridine and 150 ml of anhydrous ethyl ether are placed in a three-necked flask equipped as in Example 3. Dry nitrogen gas is bubbled through the solution and the reaction mixture cooled to 0–5 C. Dry trimellitic anhydride acid chloride is added portionwise. Temperatures of the reaction mixture is increased to 20–25 C. Stirring is continued for an hour. Methanol is added to the solution, stirred well and filtered. The precipitate is washed with methanol and ether. The dried product is recrystallized using dry acetic anhydride. Yield 65%.

Analysis: Calculated for $C_{22}H_{14}O_{10}$: C, 60.28%; H, 3.22%. Found: C, 59.14%; H, 3.25%; m.p. 211 C.

EXAMPLE 6

(BPA-C5)

2.47 Grams of 1,5-pentanediol, 3.8 grams of pyridine and 10 grams of trimellitic anhydride acid chloride are reacted as in Example 5. Yield 75%.

Analysis: Calculated for $C_{23}H_{16}O_{10}$: C, 61.07%; H, 3.57%. Found: C, 61.52%; H, 4.03%; m.p. 145 C.

EXAMPLE 7

(BPA-C6)

2.8 Grams of 1,6-hexanediol, 3.8 grams of pyridine and 10 grams of trimellitic anhyride acid chloride are reacted as in Example 4. Yield 70%.

Analysis: Calculated $C_{24}H_{18}O_{10}$: C, 61.8%; H, 3.89%. Found: C, 61.52%; H, 4.03%; m.p. 145 C.

EXAMPLE 8

(BPA-Q)

10 Grams of trimellitic anhydride acid chloride and 2.61 grams of hydroquinone are placed in a three-necked flask containing 150 ml of dry 1,2-dichloroethane. The flask is equipped as in Example 3. Dry nitrogen gas is bubbled through the solution and the reaction mixture cooled to 0–5 C. To the vigorously stirring solution, 3.8 grams of pyridine is added. Temperature of the reaction mixture is increased to 20–25 C. and stirring is continued for half an hour. Excess ethanol is added, stirred well and filtered. The precipitate is washed with ethanol followed by ether. The precipitate is dried and recrystallized using dry acetic anhydride. Yield 75%. Calculated for $C_{24}H_{10}O_{10}$: C, 62.89%; H, 2.2%. Found: C, 62.90%; H, 2.21%; m.p. 274 C.

EXAMPLE 9

(BPA-S)

The reaction between 10 grams of trimellitic anhydride acid chloride, 5.18 grams of 4,4'-thiodiphenol and 3.8 grams of pyridine is carried out in 150 ml dry anhydrous ethyl ether as in Example 8. Yield 70%.

Analysis: Calculated for $C_{30}H_{14}O_{10}S$: C, 63.6%; H, 2.49%; S, 5.66%. Found: C, 63.31%; H, 2.42%; S, 5.44%; m.p. 229 C.

EXAMPLE 10

(APN-BCA-C2)

1 Gram of 4-aminophthalonitrile is placed in a 100 ml flask containing 30 ml of dry dimethyl sulfoxide. The flask is fitted with a water cooled condenser and a calcium chloride drying tube. 1.433 Grams of BPC-C2 (Example 3) is added and the temperature of the reaction mixture is increased to 70–75 C. Stirring is continued for one hour and solvent is rmeoved in an air draft oven at 75 C. The solid product is heated at 165 C. in vacuum for one hour.

Analysis: Calculated for $C_{36}H_{16}O_8N_6$: C, 65.46%; H, 2.44%; N, 12.72%. Found: C, 65.16%; H, 2.60%; N, 12.87%; m.p. 276 C.

EXAMPLE 11

(APN-BPA-C3)

1 Gram of 4-aminophthalonitrile and 1.482 grams of BPA-C3 (Example 4) is reacted as in Example 10. The dried solid product is then heated at 175 C. in vacuum for one hour.

Analysis: Calculated for $C_{37}H_{18}O_8N_6$: C, 65.87%; H, 2.69%; N, 12.46%. Found: C, 65.24%; H, 2.9%; N, 12.36%; m.p. 241 C.

EXAMPLE 12

(APN-BPA-C4)

1 Gram of 4-aminophthalonitrile and 1.53 grams of BPA-C4 (Example 5) is reacted as in Example 10. The solid product is heated at 175 C. in vacuum for one hour.

Analysis: Calculated for $C_{38}H_{20}O_8N_{16}$: C, 66.28%; H, 2.93%; N, 12.2%. Found: C, 65.31%; H, 3.0%; N, 12.5%; m.p. 304 C.

EXAMPLE 13

(APN-BPA-C5)

1 Gram of 4-aminophthalonitrile and 1.58 grams C-5 (Example 6) is reacted as in Example 10. The dried solid product is dried first at 160 C. for one hour and then at 180 C. for half and hour in vacuum.

Analysis: Calculated for $C_{39}H_{22}O_8N_6$: C, 66.6%; H, 3.16%; N, 11.96%. Found: C, 65.85%; H, 3.11%; N, 11.77%; m.p. 238 C.

EXAMPLE 14

(APN-BPA-C6)

1 Gram of 4-aminophthalonitrile and 1.63 grams of BPA-C6 (Example 7) is reacted as in Example 10. The dried solid product is heated at 160 C. in vacuum for one hour.

Analysis: Calculated for $C_{40}H_{24}O_8N_6$: C, 67.04%; H, 3.38%; N, 11.72%. Found: C, 66.23%; H, 3.47%; N, 11.63%; m.p. 226 C.

EXAMPLE 15

(APN-BPA-Q)

1 Gram of 4-aminophthalonitrile and 1.6 grams of BPA-Q (Example 8) is reacted in 35 ml dry dimethyl sulfoxide as described in Example 10. The solid is finally heated at 175 C. in vacuum for one hr.

Analysis: Calculated for $C_{40}H_{16}N_6O_8$: C, 67.8%; H, 2.28%; N, 11.86%. Found: C, 66.49%; H, 2.56%; N, 11.40%; m.p. 280 C.

EXAMPLE 16

1 Gram of 4-aminophthalonitrile and 1.978 grams of BPA-S (Example 9) is reacted in 50 ml dimethylsulfoxide at 85–90 C. in a 100 ml round bottomed flask as described in Example 10. The solid is heated at 150 C. for one hr then at 175 C. for 1.5 hours in vacuum.

Analysis: Calculated for $C_{46}H_{20}N_6O_8S$: C, 67.6%; H, 2.47%; N, 10.29%; S, 3.93%. Found: C, 66.3%; H, 2.65%; N, 10.11%; S, 3.99%; m.p. 223 C.

EXAMPLE 17

(Polymer of APN-BPTDA)

2.0 Grams of APN-BPTDA (Example 1) and 0.173 grams of cuprous chloride are finely ground and mixed well in a small vibrating ball mill. The mixture is placed in a polymerization tube provided with a thermocouple, an inlet and an outlet for nitrogen purging. The reaction mixture is heated at 280 C. for 1.5 hours in a current of nitrogen gas. A tough shining bluish black colored material is obtained. The reaction can also be carried out in air atmosphere.

EXAMPLE 18

(Polymer of APN-PMDA)

2.0 Grams of APN-PMDA (Example 2) and 0.211 grams of cuprous chloride are finely ground and mixed well. The mixture is placed in a reaction tube as described in Example 17 and heated at 420 C. for 15 minutes in a current of nitrogen atmosphere. A tough shining bluish black colored material is obtained.

EXAMPLE 19

(Polymer of APN-BPA-C2)

1.0 Grams of APN-BPA-C2 (Example 10) and 0.075 grams of cuprous chloride are finely ground and placed in a polymerization tube as in Example 17. The reaction mixture is heated at 255 C. for 1.5 hours in a current of nitrogen. A deep blue material with pinkish reflection is obtained.

EXAMPLE 20

(Polymer of APN-BPA-C3)

An intimate mixture of 1 gram of APN-BPA-C3 (Example 11) and 0.073 grams cuprous chloride is placed in a polymerization tube as in Example 17. The mixture on heating at 275 C. for one hour in a current of nitrogen gas gave a polymeric material as described in Example 19.

EXAMPLE 21

(Polymer of APN-BPA-C4)

A finely powdered mixture of 1 gram of APN-BPA-C4 (Example 12) and 0.072 grams of cuprous chloride is heated at 305 C. for 0.5 hour in a polymerization tube as in Example 17, under nitrogen atmosphere. Polymeric material as described in Example 19 is obtained.

EXAMPLE 22

(Polymer of APN-BPA-C5)

The reaction mixture of 1 gram of APN-BPA-C5 (Example 13) and 0.070 grams of cuprous chloride was heated at 250 C. for one hour in nitrogen atmosphere as described in Example 17. A similar kind of material is obtained.

EXAMPLE 23

(Polymer of APN-BPA-C6)

A mixture of 1.0 grams APN-BPA-C6 (Example 14) and 0.069 grams cuprous chloride is heated at 245 C. for 2.5 hours in a current of nitrogen. A similar kind of material as described in Example 17 is obtained.

EXAMPLE 24

(Polymer of APN-BPA-S)

The reaction between 1.0 APN-BPA-S (Example 16) and 0.061 grams cuprous chloride is carried out at 245 C. for 2.5 hours in nitrogen atmosphere. A similar kind of material as in Example 17 is obtained.

EXAMPLE 25

(Polymer of APN-BPA-Q)

The reaction between 1.0 grams of APN-BPA-Q (Example 15) and 0.07 grams of cuprous chloride is carried out at 295 C. for 0.75 hours in nitrogen atmosphere as described in Example 17. A tough black colored material is obtained.

Substitution of other dicyano aromatic monoamines, such as $NH_2CH_2C_6H_3(CN)_2$, $NH_2C_{10}H_5(CN)_2$ and $NH_2C_{14}H_7(CN)_2$, for the 4-aminophthalonitrile in the procedures of the above examples gives similar advantageous results.

It should now be readily apparent to those skilled in the art that a process for synthesizing bisphthalonitrile derivatives having imide and ester-imide linkages, and a process for preparing phthalocyanine polymers from those derivatives, which are capable of achieving the stated objects of the invention have been provided. The bisphthalonitrile derivatives with imide and ester-imide linkages prepared by the process of this invention are precursors for phthalocyanine polymers with improved thermal stability properties over phthalocyanine polymers prepared by prior art processes. While Applicant does not intend to be bound by any particular theory of operation, it is believed that the improved properties of the resulting polymers result from more uniform bisphthalonitrile intermediates prepared by the process of this invention.

It should further be apparent to those skilled in the art that various changes in form and details of the invention as shown and described may be made. It is intended that such changes be included within the spirit and scope of the claims appended hereto.

What is claimed is:

1. A process for preparing a thermally stable solid phthalocyanine polymer consisting essentially of the steps of
   (a) combining a dicyano aromatic monoamine and an organic dianhydride to produce an amic-acid linked bisphthalonitrile compound;
   (b) dehydrocyclizing said amic acid linked bisphthalonitrile compound to produce an imide-linked bisphthalonitrile compound; and
   (c) polymerizing said imide-linked bisphthalonitrile compound to produce the desired thermally stable solid phthalocyanine polymer.

2. A process for preparing a thermally stable solid phthalocyanine polymer consisting essentially of steps of:

(a) combining a dicyano aromatic monoamine and an organic dianhydride to produce an amic-acid linked bisphthalonitrile compound;

(b) dehydrocyclizing said amic acid linked bisphthalonitrile compound to produce an imide-linked bisphthalonitrile compound; and (c) polymerizing by heating said imide-linked bisphthalonitrile compound to produce the thermally stable solid phthalocyanine polymer.

3. The process of claim 2 wherein in step (c) said imide-linked bisphthalonitrile compound is heated in contact with metal powder.

4. The process of claim 2 wherein in step (c) said imide-linked bisphthalonitrile compound is heated in contact with metal salt.

5. The process of claim 4 wherein said metal salt is cuprous chloride.

6. A thermally stable solid phthalocyanine polymer formed by the thermal polymerization of an imide-linked bisphthalonitrile compound having the formula:

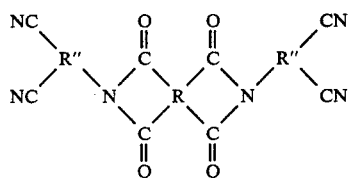

wherein R is a preformed tetravalent organic group with the proviso that said tetravelent organic group contain no additional imide group, and each R'' is a trivalent hydrocarbon group.

7. The phthalocyanine polymer of claim 6 wherein each R'' is a benzene ring.

8. The phthalocyanine polymer of claim 6 wherein R is a benzene ring.

9. The phthalocyanine polymer of claim 8 wherein each R'' is a benzene ring.

10. The phthalocyanine polymer of claim 6 wherein R is a

group in which R' is an aliphatic or aromatic group.

11. The phthalocyanine polymer of claim 10 wherein each R'' is a benzene ring.

12. The phthalocyanine polymer of claim 11 wherein R' is a 2 to 6 carbon alkylene.

13. The phthalocyanine polymer of claim 11 wherein R' is a benzene ring.

14. The phthalocyanine polymer of claim 6 wherein R is a

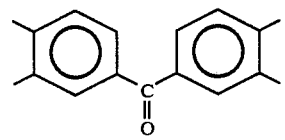

group.

15. The phthalocyanine polymer of claim 14 wherein each R'' is a benzene ring.

* * * * *